(12) United States Patent
Reguant et al.

(10) Patent No.: US 9,251,442 B2
(45) Date of Patent: Feb. 2, 2016

(54) PRINT MEDIA LOADING SYSTEM FOR A PRINTER

(75) Inventors: Xavier Domingo Reguant, Girona (ES); Oriol Moliner Rafa, Sant Cugat del Valles (ES); Raimon Castells De Monet, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 689 days.

(21) Appl. No.: 13/460,783

(22) Filed: Apr. 30, 2012

(65) Prior Publication Data

US 2013/0286415 A1    Oct. 31, 2013

(51) Int. Cl.
*B65H 26/02* (2006.01)
*G06K 15/16* (2006.01)
*B41J 15/04* (2006.01)

(52) U.S. Cl.
CPC .............. *G06K 15/16* (2013.01); *B41J 15/042* (2013.01)

(58) Field of Classification Search
CPC ................................ G06K 15/16; B41J 15/042
USPC ............... 242/534, 534.1, 419.8, 420.5, 563; 101/217, 248, 415.1; 226/38, 91, 108, 226/111
See application file for complete search history.

(56) References Cited

U.S. PATENT DOCUMENTS

| | | | | |
|---|---|---|---|---|
| 2,427,049 | A * | 9/1947 | Gollwitzer | 235/419 |
| 2,600,636 | A * | 6/1952 | Goetz et al. | 192/33 R |
| 2,731,910 | A * | 1/1956 | Gruver | 101/47 |
| 4,581,993 | A * | 4/1986 | Schoneberger | 101/217 |
| 4,599,129 | A * | 7/1986 | Kerwin | 156/361 |
| 5,809,892 | A | 9/1998 | Kruger et al. | |
| 5,967,394 | A * | 10/1999 | Crowley et al. | 226/111 |
| 6,454,474 | B1 * | 9/2002 | Lesniak et al. | 400/582 |
| 6,568,865 | B1 | 5/2003 | Fujioka et al. | |
| 7,419,318 | B2 | 9/2008 | Hayakawa | |
| 7,429,104 | B2 | 9/2008 | Silverbrook et al. | |
| 2004/0206264 | A1 * | 10/2004 | Dick et al. | 101/483 |
| 2011/0043580 | A1 | 2/2011 | Silverbrook et al. | |
| 2011/0265674 | A1 | 11/2011 | Dim et al. | |

* cited by examiner

*Primary Examiner* — William A Rivera
(74) *Attorney, Agent, or Firm* — HP Inc. Patent Department

(57) ABSTRACT

The invention relates to a print media loading system for a printer, wherein the printer includes a print media input, a print media output, and a print media path located between the print media input and the print media output. The print media loading system comprises a print media drive mechanism associated with the print media input, and print media output device associated with the print media output. The print media output device is operatively coupled to the print media drive mechanism so as to control feeding of the print media through the print media path by actuation of the print media output device. The invention also provides a corresponding printing system and a method of loading print media into a printer.

18 Claims, 1 Drawing Sheet

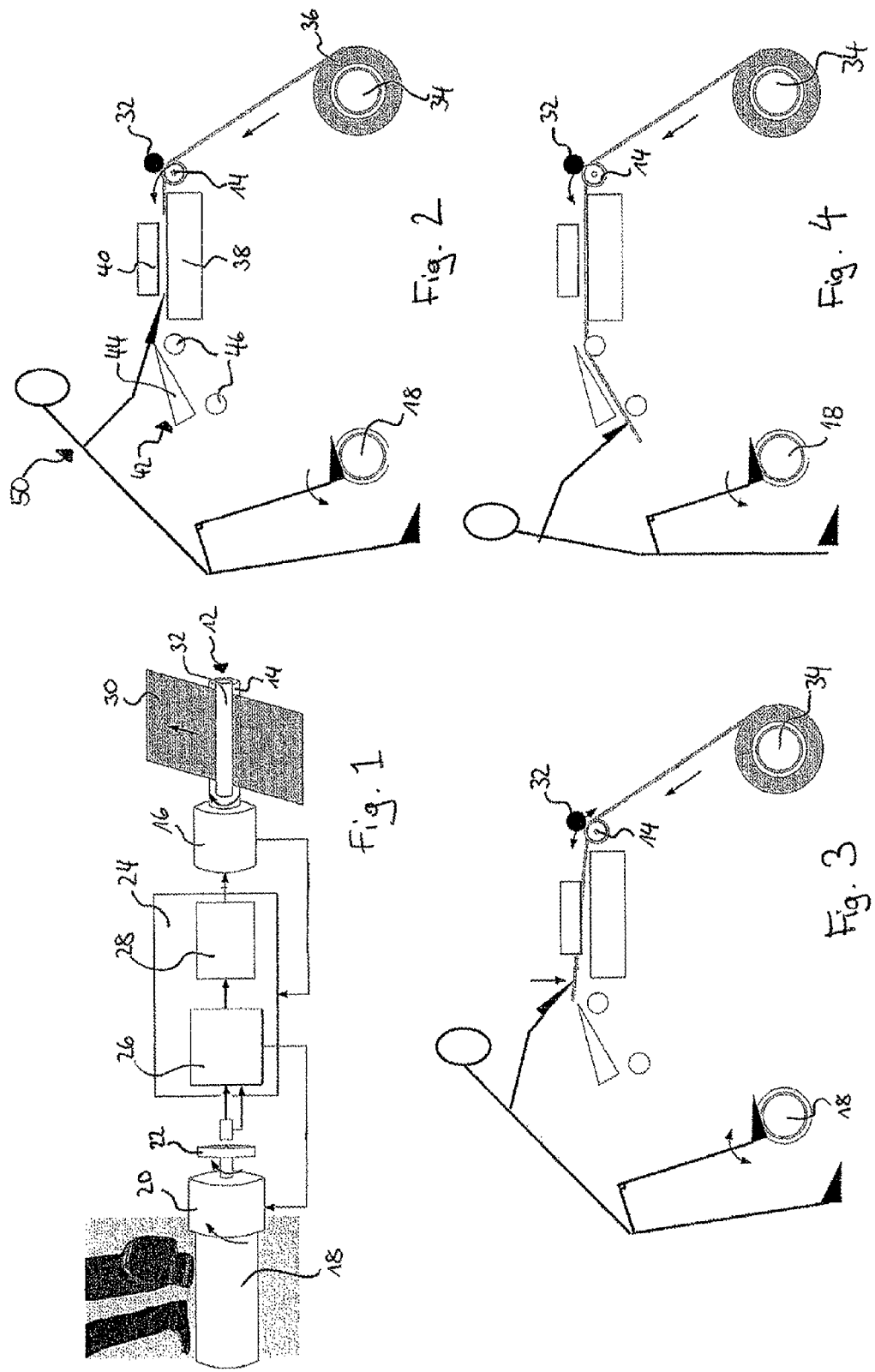

PRINT MEDIA LOADING SYSTEM FOR A PRINTER

BACKGROUND

Printing systems are known in the art where a continuous print media is fed through a print zone, e.g. from a print media supply roll to a print media output roll. In this and other print systems where a continuous print media is fed through the printer, it is necessary to thread the print media from print media input, through the print media path and to a print media output. Many printing systems, such as large-format printers and industrial printers for example, can have long and complex print media paths so that it can become tedious to thread the print media through said print media path. There are prior art printing systems which provide dedicated threading mechanisms which grab and guide the print media from the print media input through the print media path to the print media output. In other printers, threading of the print media is performed manually. The present disclosure relates to a print media loading system for this type of printing systems as well as other printers using a continuous print media.

BRIEF DESCRIPTION OF THE DRAWINGS

For a detailed description of exemplary embodiments of the invention, reference will now be made to the accompanying drawings in which:

FIG. 1 shows, in the form of a schematic block diagram, components of a printing system according to one example;

FIG. 2 schematically shows a cross-section through the print media path of a printing system according to one example, for illustrating a paper loading process;

FIG. 3 shows a similar view as FIG. 2, with the print media partially threaded through the print media path; and FIG. 4 shows a similar view as FIGS. 2 and 3, with the print media advanced further through the print media path.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

An example of the invention provides a print media loading system for a printer, the printer including a print media input, a print media output, and a print media path located between the print input and the print media output. The print media loading system comprises a print media drive mechanism associated with a print media input, and a print media output device associated with the print media output. The print media output device is operatively coupled to the print media drive mechanism so as to control feeding of the print media through the print media path by actuation of the print media output device. The print media output device can be an output roller spindle for receiving the print media or another device located at the print media output side of the printer. In one example, the print media output device Is located in a lower region of the printer and can be operated by a foot of an operator. In another example, the print media output device can be operated manually.

An example of the invention also provides a printing system for printing on a continuous print media which includes a print media input, a print media output, and a print media path located between the print media input and the print media output. The print media drive mechanism is associated with the print media input, and a print media output device is associated with the print media output. The print media output device is operatively coupled to the print media drive mechanism so as to control feeding of the print media through the print media path by actuation of the print media output device.

According to a further aspect, an example of the invention provides a method of loading print media into a printer wherein the printer includes a print media input, a print media output, and a print media path located between the print media input and the print media output and wherein print media drive mechanisms associated with the print media input and a print media output device is associated with the print media output. The method comprises the steps of operatively coupling the print media output device and the print media drive and actuating the print media output device to control feeding of the print media through the print media path. According to one aspect, the media output device is actuated by a foot of an operator, while the print media is threaded manually through the print media path.

FIG. 1 schematically shows, in the form of a block diagram, one example of a printer system wherein many details of the printer are left out for the sake of clarity. As shown in FIG. 1, the printer system comprises a paper drive mechanism 12, including a drive roller 14 which is driven by a drive roller motor 16 at an input side of the printer. At an output side of the printer, a output roller spindle 18 is driven by an output motor 20. The output motor 20 is coupled to a rotary encoder 22, the output signal of which is forwarded to a servo controlled system 24. In the example shown, the servo controlled system 24 comprises a first computation module 26 for converting the signals output by the encoder 22 into signals corresponding to the angle, direction and speed of rotation of the output roller spindle 18 and a second computation module 28 for converting the output signals of the first module 26 into one or more control signals, for controlling the drive roller motor 16 and hence the direction, speed and angle of rotation of the drive roller 14. Additionally, the drive roller motor 16 can comprise a rotary encoder (not shown) for generating a feedback signal to the servo controlled system 24 and another feed-back loop can be provided between the servo controlled system 24 and the output motor 20. A gear box (not shown) can be provided between the output roller spindle 18 and the output motor 20.

In the example of the printing system shown in FIG. 1, the output roller spindle 18 is an example of a print media output device which is operatively coupled to the print media drive mechanism, in this example the driver roller motor 16 of the drive roller 14. The drive roller 14 usually is provided in a printer of this type for drawing a length of a continuous print media from a media web roll and into the printer. The output roller spindle 18 serves as a print media collector device when the continuous print media exits the print media path at the print media output.

In the example shown in FIG. 1, the print media output roller spindle 18 hence is operatively coupled to the print media drive mechanism, more particularly to the print media drive roller 14 so that feeding of the print media through the print media path can be controlled by actuating the output roller spindle 18.

In the example shown in FIG. 1, during loading of the print media into the printer, the output roller spindle 18 can be used as an input or control device to control the movement of the print media into and through the print media path via the drive roller 14. In one example, the output roller spindle 18 is arranged so that it can be actuated by a foot of an operator so that the hands of the operator are free to thread the print media into and through the print media path. In another example, the output roller spindle is arranged so that it can be actuated manually.

Instead of the output roller spindle 18, another device associated with the printer output can be used for controlling the print media drive mechanism wherein the print media output device is operatively and/or spatially associated with the print media output. In one example, the print media output device is a foot-operated device which allows an operator to control feeding of the print media through the print media path while leaving the operator's hands free for assisting manual threading of the print media through the print media path. The print media output device also can be some type of actuating means, like a pedal or switch, in particular a foot-operated pedal or switch, which is located at or near the print media output and is operatively coupled with a part of the print media drive mechanism, either directly or via one of a plurality of print media feeding components along the print media path, such as rollers, pinch wheels, print media output spindle and the like. In another example, the print media output device is operated manually.

In one example, the print media output device is a hardware component of the printer which exists in a standard printer and need not be provided as a separate dedicated component for controlling print media movement. Rather, this example takes advantage of existent components of the printer for controlling the movement of the print media during the loading operation.

The servo controlled system 24 can be configured in such a way that, when the operator rotates the output roller spindle 18 in a forwarded direction, the print media moves forward into and through the print media path and, when the operator rotates the output roller spindle 18 backwards, the media moves backwards through the print media path and out of the print media input. The rotary encoder 22 can be a quadrature encoder generating a position signal and a quadrature position signal for extracting the direction and angular speed (w) of rotation of the output motor 20 in the first computation module 26. From the direction and angular speed (w) of the rotation of the output motor 20, the second computational module 28 can calculate e.g. a current to be applied to the drive roller motor 16, I=K×w, for turning the drive roller 14 accordingly. For controlling the rotation of the drive roller 14, the drive roller motor 16 can be provided with a drive roller encoder, the output signal of which is fed back to the servo controlled system 24.

For driving the print media into and through the print media path, the drive roller 14 should have traction on the print media wherein the print media can be any type of continuous printing material, such as paper, a plastic sheet material, fabric or any other material suitable for receiving printed matter. In one example, the print media is provided as web-shaped material on a roll but is not limited to this type of material. The print media could also be provided in single sheets having a length such that it is possible to continuously feed the length of print media through the printer.

In the example shown in FIG. 1, it is possible to translate the movement of the output roller spindle 18 into a corresponding movement of the drive roller 14 wherein the drive roller 14 will feed a print media 13 as soon as it has traction on the print media. In the example shown in FIG. 1, the movement of the output spindle roller 18 is detected by encoder 22 coupled to output motor 20, and the angle, direction and speed of the rotation is computed by first computation module 26 and translated into control signals by second computation module 28 to move the print media 30 using the drive roller motor 16 and drive roller 14. It is possible to translate the rotation of the output roller spindle 18 into a corresponding rotation of the drive roller 14 and/or to reduce or increase the angle and speed of rotation as well as to maintain or reverse the direction of rotation. More generally speaking, a movement detected at the output of the printer system, such as movement of the output roller spindle, is converted into a movement at the input of the printer system, more particularly a movement of the drive roller 14. In this particular example, the output roller spindle 18 and the drive roller 14 can be operatively coupled to behave as if the print media already had been threaded through the print media path and received by the output roller spindle 18. This allows to precisely control movement of the print media 30 into and through the print media path, using hardware components already present in many continuous web printers. If, as in the example of FIG. 1, print media output device can be actuated by a foot of an operator, this leaves the hands of the operator free for handling the print media and assisting in the threading of the media through the print media path.

Threading media from an input to an output of a print media path in continuous web printers, such as roll-to-roll-printers, in particular large-format printers, is often challenging. Once the print media roll is loaded at a media input spindle, the operator will thread the leading edge of the print media into the print media drive mechanism which can be provided by the drive roller 14 and a cooperating pinch wheel 32. The operator will close the nip between the pinch wheel 32 and the drive roller 14 so that the drive mechanism 12 has traction on the print media 30. Thereafter, the print media needs to be threaded through the rest of the print media path which may comprise a print zone and a curing zone, for example, and finally shall be attached to some type of media receiving device, such as an output roller spindle in a roll-to-roll system or another print media receiving device. In an ideal word, the print media would be automatically threaded through the print media path up to the media output without operator intervention. Unfortunately, the variety of print media to be supported, print media width of up to 126 Inch (320 cm) and more, and the fact that the print media path is not straight usually makes it necessary to have an operator helping the print media get through the right path all along its width.

As indicated above, in one example, the print media output device for controlling feeding of the print media through the print media path is a device already existent in a printer hardware. This example hence can be implemented with no or little additional costs as only an adaption of the electronics of the printer system is necessary for detecting the actuation of the print media output device and for linking this actuation with the print media drive mechanism.

If the output roller spindle is used as the print media output device, this has the advantage that the output roller spindle is as wide as the media path so that an operator can control the media movement from any location along the media path width.

If the print media output device or a component for actuating the print media output device is located in a lower region of the printer so as to be operable by a foot of an operator, the operator has his or her hands free for assisting the threading of the print media through the print media path. This allows faster threading and prevents the need for the operator to bend in order to move the output roller spindle by hand. There is no need for the operator to move to a printer panel or other separate control means to control the print media movement during loading. Moreover, if the output roller spindle is used as print media output device, the movement of the print media through the printer is as if the print media already had been linked to the output roller spindle. The operator hence has a very "natural" user experience because the system described herein can virtually link the movement of the paper from the input roller to the output roller spindle before it is actually physically linked to it. The physical link happens only at the end of the loading process, when the print media is attached to the output roller spindle. However, it is also possible to located the print media output device in an upper region and to operate the device e.g. with one hand and still achieve the same effect.

In one example, a high resolution quadrature encoder 22 in the output motor 20 is used and allows for a sophisticated control of the movement. The amount and speed at which the print media moves can be fine tuned through the servo controlled system 24 to make threading easy. Fine control is possible both for forward and backwards movement. For example, it is possible to increase the speed of the print media movement relative to the movement of the output roller spindle, to define speed limits, to translate a large movement of the output roller spindle into a small movement of the drive mechanism and the like. Additionally, if the output motor 20 of the output roller spindle 18 and the drive motor 16 of the drive roller 14 are used, it can be made easier for the operator to move the output roller spindle 18 e.g. when compared to a fully mechanical system. For example, as soon as a movement of the output roller spindle 18 in its axis is detected, this movement can be amplified or sustained by applying a current to the output motor 20. In one example, the system further allows for a complex servo control, taking into account the rotary encoder 22 in the output motor, as an input device of the servo controlled system 24, and an additional encoder at the drive roller motor 16 for indicating movement of the print media. Any control equation can be applied to assist in media loading and threading.

In the following, an example of the process of loading a print media into a printer is described with reference to FIGS. 2, 3, and 4. This example is based on a roll-to-roll printer using a continuous web material but it will be understood that the examples can be applied to other types of printers and print media as well. The same reference numbers as in the previous figure are used for corresponding parts.

FIG. 2 schematically shows selected components of a printer according to one example; namely: a paper supply spindle 34 having a supply of continuous paper provided thereon, as one example of a print media; a drive roller 14 and a pinch wheel 32; a print platen 38, a pen carriage 40, a curing module 42, including a heat block 44 and two guide rollers 46; and the output roller spindle 18. In this example, the print media path runs from the paper supply spindle 34, between the drive roller 14 and the pinch wheel 32, between the print platen 38 and the pen carriage 40, between the heat block 44 and the guide rollers 46, and to the output roller spindle 18. It is to be understood that this print media path is only a very simple example of print media path and that different, more or less complex print media paths can be provided for.

In the loading process which is explained with reference to FIGS. 2, 3, and 4, the paper 36 is first drawn from the paper supply spindle 34 and introduced into the nip between the drive roll 14 and the pinch wheel 32. The nip then is closed so that the drive roller 14 has traction on the paper and can control paper movement. This first step can be performed automatically or manually. In the example shown in FIG. 2, the operator 50 turns the output roller spindle 18 using one of his feet and this movement is translated into a corresponding movement of the drive roller 14 which makes the paper 36 advance into the printer and through the print media path. A control system, such as the servo controlled system 24, can be configured in such a way that a clockwise rotation of the output roller spindle 18 makes the paper 36 advance into the printer and a counter clockwise rotation moves the paper backwards, out of the printer. As described above, any other suitable translation between the movement of the output roller spindle 18 or other output device and the print media drive mechanism is possible.

As shown in FIG. 3, when the operator 50 continuous to turn the output roller spindle 18, the paper 36 continues to be fed through the print path, between the print platen 38 and the pen carriage 40 and further into the curing module 42. Because the operator 50 actuates the output roller spindle 18 or other print media output device by one of his feet, his hands are free to assist the paper in threading through the print media path and into the curing module 42. Movement of the paper 36 is fully controlled by foot, more particular, by the rotation of the output roller spindle 18, in this example.

As shown in FIG. 4, the operator 50 keeps moving the output roller spindle 18 with his foot until the paper 36 has passed through the print media path and leaves the curing module 42 where the operator can grab the leading edge of the print media with his hands and finally connect it to the output roller spindle 18. The print media threading process then is completed.

Examples of the present invention can be implemented such that in terms of mechanical construction nothing needs to be added to the print media path of current printers. Examples of the invention can use an output roller mechanism including an output motor having a quadrature coder attached to it and an output roller spindle that is attached to the output motor, for example. Optionally, a gear box can be provided between the output roller spindle and the output motor. As in a conventional type of printer, once the paper is completely loaded it is attached to the output roller spindle which has the function of maintaining tension along the print media path and collecting the paper by rolling as it gets consumed when printing. In one example, the output roller mechanism is used for controlling the paper loading process before the paper is completely loaded by using it as a control device in the paper loading process. In other examples, other print media output devices can be used for this purpose. As described above, once the print media drive mechanism has traction on the paper, an operator can actuate the print media output device, e.g. rotate the output roller spindle in either direction by sliding the foot over it, and a control mechanism, such as the servo controlled system, can capture this motion by reading the encoder attached to the output motor, or using another motion detection device. These readings can then be used to compute a movement to be applied to the paper. By doing so, the operator can make the paper advance or go backwards into the paper path with his foot and simultaneously use his hands to thread the paper through the narrow parts of the print media path.

What is claimed is:

1. A print media loading system for a printer, the printer comprising a print media input, a print media output, and a print media path located between the print media input and the print media output, the print media loading system comprising:

a print media drive associated with the print media input, the print media drive including a drive roller; and an output roller spindle associated with the print media output, the output roller spindle being actuatable via at least one of a foot-operated pedal or foot-operated switch, rotation of the output roller spindle to cause a corresponding rotation of the drive roller to feed a leading edge of the print media through the print media path toward the output roller spindle.

2. The print media loading system according to claim 1 wherein the output roller spindle is able to receive the print media thereon.

3. The print media loading system according to claim 1, further including a detector to detect rotation of the output roller spindle.

4. The print media loading system according to claim 3 wherein the detector is operatively coupled to the print media drive, the print media drive to feed print media when rotation of the output roller spindle is detected.

5. The print media loading system according to claim 3, further including a servo controlled system operatively coupled to the detector, the servo controlled system to receive an output of the detector as an input signal and to output a control signal to the print media drive.

6. The print media loading system according to claim 5 wherein the servo controlled system is to translate a direction, a speed, and an amount of rotation of the output roller spindle into a corresponding direction, a corresponding speed, and a corresponding amount of rotation of the drive roller.

7. The print media loading system according to claim 6 wherein the servo controlled system is to increase or reduce at least one of the corresponding speed or the corresponding amount of rotation of the drive roller relative to the speed or the amount of rotation of the output spindle roller.

8. The print media loading system according to claim 5, further including an output motor operatively coupled to the output roller spindle, wherein the detector is a rotational encoder operatively coupled to the output motor.

9. A print media loading system for a printer, the printer comprising a print media input, a print media output, and a print media path located between the print media input and the print media output, the print media loading system comprising:
   a print media drive associated with the print media input, the print media drive including a drive roller; and
   a print media output device associated with the print media output, the print media output device including an output roller spindle;
   wherein the print media output device is operatively coupled to the print media drive so that rotation of the output roller spindle causes a corresponding rotation of the drive roller to feed a leading edge of the print media through the print media path toward the print media output device, wherein the output roller spindle is able to receive the print media thereon, and the output roller spindle extends across a width of the printer and is located in a lower region of the printer so as to be rotatable by a foot of an operator.

10. A print media loading system for a printer, the printer comprising a print media input, a print media output, and a print media path located between the print media input and the print media output the print media loading system comprising:
   a print media drive associated with the print media input, the print media drive including a drive roller; and
   a print media output device associated with the print media output, the print media output device including an output roller spindle;
   wherein the print media output device is operatively coupled to the print media drive so that rotation of the output roller spindle causes a corresponding rotation of the drive roller to feed of a leading edge of the print media through the print media path toward the print media output device, and the output roller spindle is located in a lower or upper region of the printer so as to be rotatable by a foot or hand of an operator.

11. A printing system for printing on a continuous print media, the system comprising:
   a print media input;
   a print media output;
   a print media path located between the print media input and the print media output;
   a print media drive associated with the print media input, actuation of the print media drive to cause a leading edge of the print media to advance from the print media input, along the print media path, toward the print media output, and
   a print media output device associated with the print media output, the print media output device being actuatable via at least one of a foot-operated pedal or foot-operated switch,
   wherein the print media output device is operatively coupled to the print media drive so that actuation of the print media output device causes actuation of the print media drive to cause and control advancement of a leading edge of the print media through the print media path from the print media input toward the print media output.

12. A printing system for printing on a continuous print media, the system including:
   a print media input;
   a print media output;
   a print media path located between the print media input and the print media output;
   a print media drive associated with the print media input such that actuation of the print media drive causes a leading edge of the print media to advance from the print media input, along the print media path, toward the print media output, and
   a print media output device associated with the print media output,
   wherein the print media output device is operatively coupled to the print media drive so that actuation of the print media output device causes actuation of the print media drive to cause and control advancement of a leading edge of the print media through the print media path from the print media input toward the print media output,
   the print media output device includes an output roller spindle for receiving the print media, wherein actuation of the print media output device includes rotation of the output roller spindle, and wherein the output roller spindle extends across a width of a printer and is located in a lower region of the printer so as to be operable by a foot or a hand of an operator; and
   the print media drive includes a drive roller and a drive roller motor.

13. The printing system of claim 12, further including
   an output motor operatively coupled to the output roller spindle, the output motor including a rotational encoder operatively coupled to the output motor; and
   a servo controlled system operatively coupled to the rotational encoder for receiving an encoder signal corresponding to the rotation of the output roller spindle as an input signal and for outputting a control signal to the drive roller motor of the drive roller.

14. A method of loading print media into a printer, the printer comprising a print media input, a print media output, and a print media path located between the print media input and the print media output, and further comprising a print media drive associated with the print media input, and a print media output device associated with the print media output, the method comprising:
    operatively coupling the print media output device and the print media drive;
    rotating an output roller spindle of the print media output device in a first direction, via at least one of a foot-operated pedal or foot-operated switch, to cause a corresponding rotation of a drive roller of the print media drive; and
    feeding a leading edge of the print media along the print media path, from the print media input, toward the print media output during and based on the rotating of the output roller spindle in the first direction.

15. The method of claim 14, further including:
    collecting the print media on the output roller spindle after feeding the leading edge of the print media along the print media path.

16. The method of claim 14, further including:
    rotating the output roller spindle in a second direction that is opposite the first direction; and
    withdrawing the leading edge along the print media path toward the print media input as a result of rotating the output roller spindle in the second direction.

17. A method of loading print media into a printer, the printer comprising a print media input a print media output and a print media path located between the print media input and the print media output, and further comprising a print media drive associated with the print media input, and a print media output device associated with the print media output, the method comprising:
    operatively coupling the print media output device and the print media drive;
    rotating an output roller spindle of the print media output device in a first direction to cause a corresponding rotation of a drive roller of the print media drive; and
    feeding a leading edge of the print media along the print media path, from the print media input, toward the print media output during and as a result of the rotating of the output roller spindle in the first direction, wherein rotating the output roller spindle includes rotating the output roller spindle with a foot of an operator.

18. The method of claim 17, further including:
    threading the print media manually through the print media path while rotating the output roller spindle.

* * * * *

UNITED STATES PATENT AND TRADEMARK OFFICE
CERTIFICATE OF CORRECTION

PATENT NO. : 9,251,442 B2  
APPLICATION NO. : 13/460783  
DATED : February 2, 2016  
INVENTOR(S) : Xavier Domingo Reguant et al.

Page 1 of 1

It is certified that error appears in the above-identified patent and that said Letters Patent is hereby corrected as shown below:

Claims

In column 7, line 61, in Claim 10, delete "output the" and insert -- output, the --, therefor.

In column 10, line 5, in Claim 17, delete "input a" and insert -- input, a --, therefor.

In column 10, line 5, in Claim 17, delete "output" and insert -- output, --, therefor.

Signed and Sealed this
Twenty-sixth Day of July, 2016

Michelle K. Lee
*Director of the United States Patent and Trademark Office*